No. 670,650. Patented Mar. 26, 1901.
H. W. THOMPSON.
FARM OR YARD GATE.
(Application filed Apr. 28, 1900.)
(No Model.)
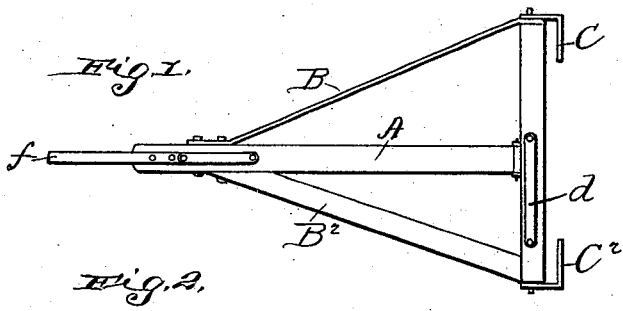
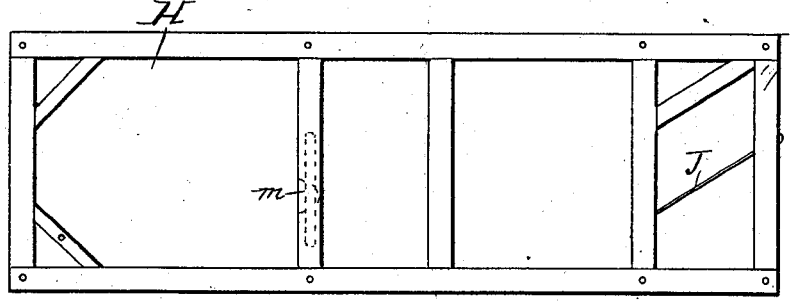
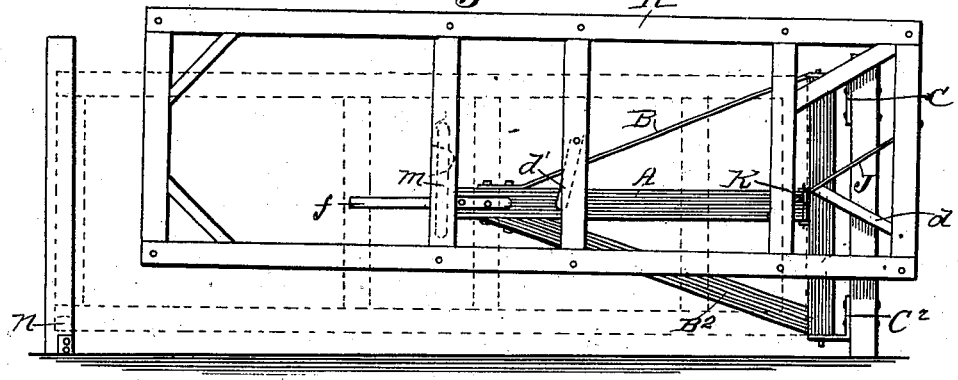
Witnesses
Inventor:
H. W. Thompson.

UNITED STATES PATENT OFFICE.

HENRY W. THOMPSON, OF BAGLEY, IOWA, ASSIGNOR OF ONE-HALF TO JOHN J. MURPHY, OF SAME PLACE.

FARM OR YARD GATE.

SPECIFICATION forming part of Letters Patent No. 670,650, dated March 26, 1901.

Application filed April 28, 1900. Serial No. 14,781. (No model.)

*To all whom it may concern:*

Be it known that I, HENRY W. THOMPSON, a citizen of the United States, residing at Bagley, in the county of Guthrie and State of Iowa, have invented a new and useful Farm-Gate, of which the following is a specification.

My object is to connect a gate with fixed gate-posts in such a manner that the gate can be readily elevated relative to the ground to swing over accumulated snow and also moved longitudinally relative to the fixed posts as required to swing clear of the posts in opening and closing.

My invention consists in the arrangement and combination of a gate-carrier, a gate linked to the carrier, means for guiding the movements of the gate relative to the gate-carrier and fixed posts, as hereinafter set forth, pointed out in the claim, and illustrated in the accompanying drawings, in which—

Figure 1 is a side view of the gate-carrier adapted to be hinged to a fixed post to swing horizontally. Fig. 2 is a side view of a gate adapted to be adjustably connected with the gate-carrier to be moved vertically and longitudinally relative to the carrier. Fig. 3 is a side view showing the gate-carrier hinged to a fixed post and the gate suspended upon the carrier as required for practical use and in an elevated position.

Dotted lines indicate the position of the gate when lowered and closed.

The letter A designates the gate-carrier in the form of a T-shaped frame that has braces B and B² at its top and bottom, and hinge-irons C and C², pivotally connected with the top and bottom. A straight link $d$ is pivoted to the upright of the carrier A and a straight bar $f$ fixed to the free end of the horizontal portion to be slidingly connected with the gate.

The gate H has a fixed rod J in an inclined position at its rear end portion and is adjustably connected with the gate-carrier A by means of the link $d$ and a link $d'$. These links are pivoted to the gate-carrier and the gate in such a manner that the gate can be elevated into position, as shown in Fig. 3, to facilitate swinging the gate horizontally and also lowered, as indicated by dotted lines, to close and fasten it. A clevis K, placed astride the fixed rod J and fixed to the gate-carrier A, serves, in combination with said rod, as a means for guiding and restricting the movements of the gate relative to the gate-carrier.

A loop $m$, fixed to one of the uprights in the gate, incloses the bar $f$ and aids in guiding the motions of the gate.

A device $n$, fixed to the bottom portion of the fixed post at the free end of the gate, serves as a rest and lock that will prevent the gate from swinging away from the post when the gate is engaged thereby.

To open the gate, the front end must be lifted and at the same time pushed rearward to place the gate in position, as shown in Fig. 3, before it can be swung out of the way to allow passage for a wagon between the fixed gate-posts.

Having described the construction and operation of my invention, its practical utility will be understood by persons familiar with the art to which it pertains.

What I claim as new, and desire to secure by Letters Patent, is—

A farm-gate, comprising a gate having a fixed inclined rod at its rear end portion, a gate-carrier hinged to a fixed post, links pivoted to the gate-carrier and gate for suspending the gate, a clevis placed astride of the fixed rod in the gate and fixed to the gate-carrier, a bar fixed to the free end of the carrier and a loop fixed to one of the gate-uprights to inclose said bar, arranged and combined to operate in the manner set forth for the purposes stated.

HENRY W. THOMPSON.

Witnesses:
L. L. GREEN,
J. W. THOMPSON.